US006552834B2

(12) United States Patent
Bhatia et al.

(10) Patent No.: US 6,552,834 B2
(45) Date of Patent: Apr. 22, 2003

(54) METHODS AND APPARATUS FOR PREVENTING DEADBANDS IN AN OPTICAL COMMUNICATION SYSTEM

(75) Inventors: Vikram Bhatia, Painted Post, NY (US); Robert W. Hallock, Santa Rosa, CA (US); James M. Harris, Elmira, NY (US); Edward Murphy, Painted Post, NY (US); Derek E. Spock, Chelmsford, MA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/784,675

(22) Filed: Feb. 15, 2001

(65) Prior Publication Data

US 2003/0020984 A1 Jan. 30, 2003

Related U.S. Application Data

(60) Provisional application No. 60/183,524, filed on Feb. 18, 2000.

(51) Int. Cl.[7] .............................................. H04J 14/02
(52) U.S. Cl. ...................................... 359/130; 359/127
(58) Field of Search ................................ 359/127, 130, 359/128, 129; 385/37

(56) References Cited

U.S. PATENT DOCUMENTS

| 5,572,357 A | 11/1996 | Nakazato et al. ............ 359/341 |
| 5,786,915 A | 7/1998 | Scobey ........................ 359/127 |
| 5,926,300 A | 7/1999 | Miyakawa et al. .......... 359/124 |
| 5,982,518 A | 11/1999 | Mizrahi ....................... 359/130 |
| 6,132,104 A | 10/2000 | Bliss et al. ..................... 385/53 |
| 6,144,474 A | * 11/2000 | Nitta et al. ................... 359/179 |

OTHER PUBLICATIONS

U.S. patent application, Ser. No. 09/398,657, filed Sep. 17, 1999, Bhatia et al. (US Pat. 6,351,588).

* cited by examiner

Primary Examiner—Leslie Pascal
Assistant Examiner—Dalzid Singh
(74) Attorney, Agent, or Firm—Mary Y. Redman

(57) ABSTRACT

Methods and apparatus for combining, adding, and/or dropping channels in optical communication systems that utilize thin film filters without the creation of deadbands, using fiber Bragg gratings and additional thin film optical filters, are described. According to one aspect of the invention, an optical filter is used to drop a wavelength range from an optical signal. Prior to the optical signal entering the optical filter, one or more fiber Bragg gratings and an optical circulator are used reflects a portion of the communications spectrum which would normally lie with the deadband region of the optical filter. According to another aspect of the present invention, an optical filter is used to combine a first optical signal and a second optical signal to form a combined optical signal. Neither the first optical signal nor the second optical signal includes channels within a deadband region of the optical filter. One or more fiber Bragg gratings and an optical circulator or a coupler are used to add a third optical signal to the combined optical signal. The third optical signal includes signal wavelengths within the deadband region of the optical filter.

22 Claims, 12 Drawing Sheets

- red band
- blue band

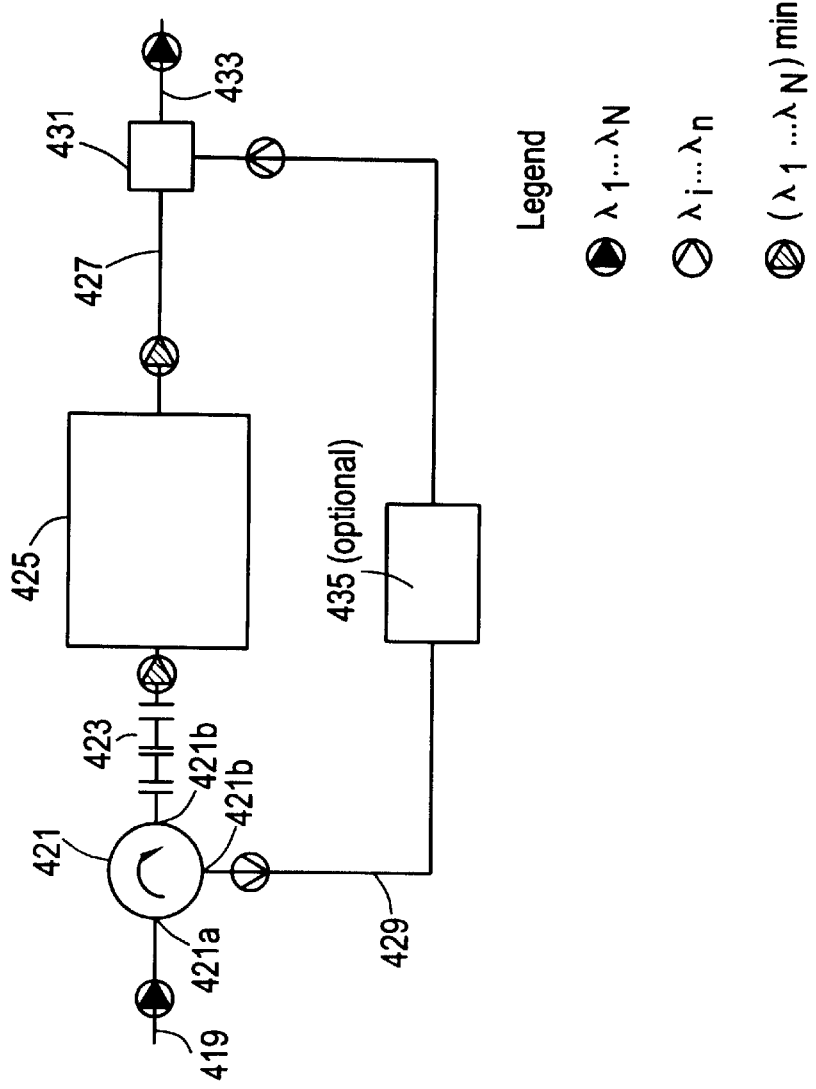

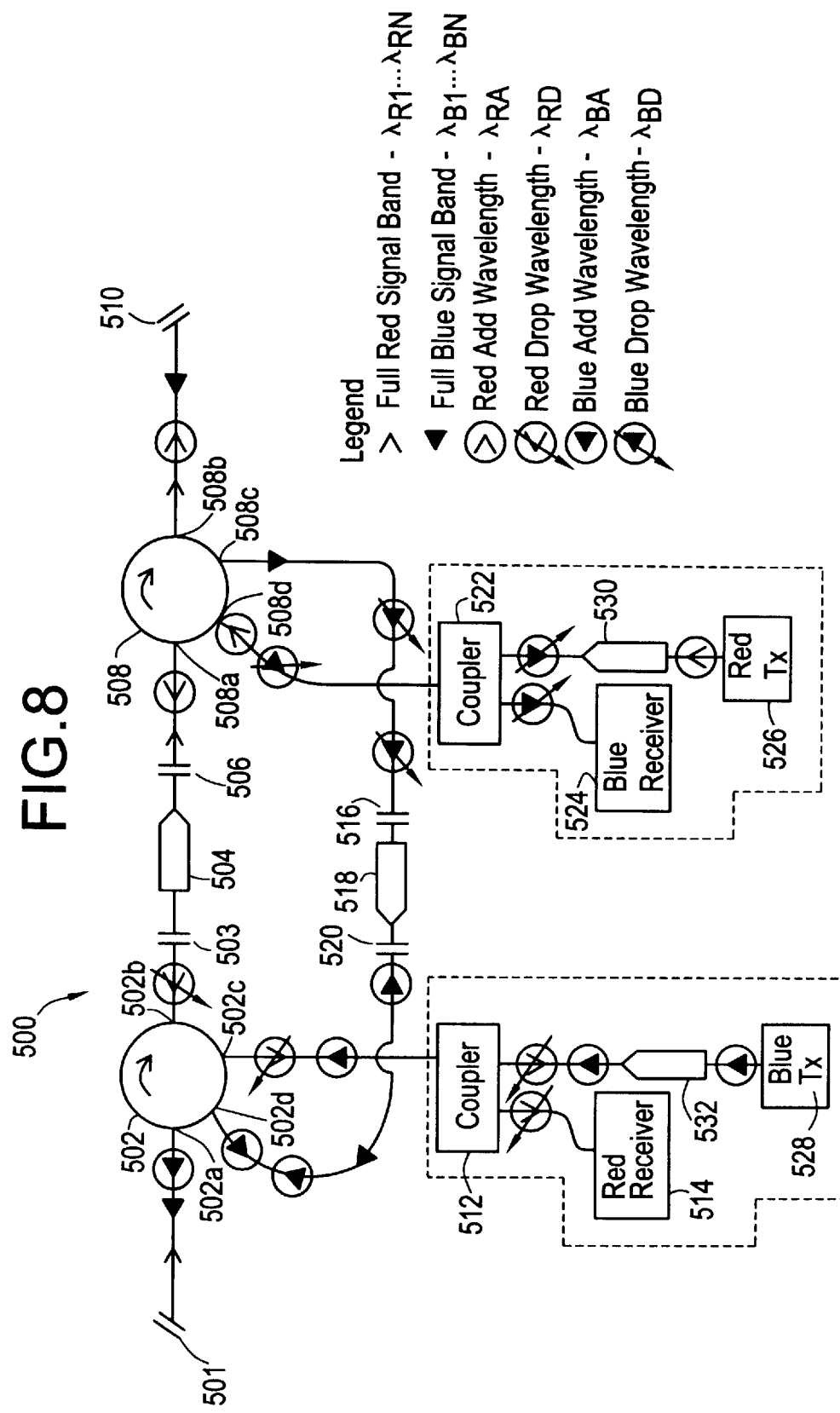

METHODS AND APPARATUS FOR PREVENTING DEADBANDS IN AN OPTICAL COMMUNICATION SYSTEM

CROSS-REFERENCE TO RELATED APPLICATION

This application claims the benefit of priority under 35 USC §120 of U.S. Provisional Application No. 60/183,524, filed on Feb. 18, 2000, the content of which is relied upon and incorporated herein by reference in its entirely.

FIELD OF THE INVENTION

The present invention relates generally to prevention of deadbands in optical communication systems. More specifically, the present invention relates to methods and apparatus for using optical devices without the creation of deadbands.

TECHNICAL BACKGROUND

While fiber-optic cable is finding widespread use for data transmission and other telecommunication applications, the cost of new installed fiber-optic cable presents a barrier to increased carrying capacity. Wavelength division multiplexing (WDM) allows multiple signals at different wavelengths to be carried by a fiber-optic line or other waveguide. Presently preferred wavelength bands for fiber-optic transmission media include those centered at about 1300 nm (nanometers), about 1550 nm (C band), and about 1590 (L Band). The C band, with a useful bandwidth of approximately 10 to 40 nm depending on the application, is preferred in many applications because of its minimal absorption and the commercial availability of erbium doped amplifiers that operate in the C band. Ideally, to substantially increase an optical fiber's signal carrying capacity, the C band or L band would be divided into multiple discrete channels through a technique referred to as dense wavelength division multiplexing. Dense wavelength division multiplexing can separate this bandwidth into multiple wavelengths, allowing up to 80 or more wavelengths. For example, the International Telephony Union (ITU) Grid provides standard center wavelengths for channels in the 1550 nm wavelength band, at 100 GHz spacing (approximately 0.8 nm).

In addition to the requirement for multiplexing multiple signal wavelengths onto a single optical fiber, the need exists to route one or more channels of the multiplexed channels to differing locations. This routing ability, known as add/drop functionality, is accomplished by dropping out (demultiplexing) "old" channels from the optical fiber and adding in (multiplexing) "new" channels. One preferred method of multiplexing and demultiplexing optical wavelengths utilizes thin film optical filters to add and drop portions of the communications spectrum. In order to add in or drop out parts of the continuous spectrum of closely packed wavelengths, allowance must be made for deadbands, or transition regions, of thin film optical filters. In these regions, system designers must deactivate signal wavelengths as they are affected by the rising edge region and falling edge region of optical filters. Other optical devices or components may have deadbands (spectral regions which are effectively unuseable or which are not subject to the desired effect of the device) for other reasons.

As system designers strive for greater channel counts with increasing bandwidth, the need for fewer and smaller dead zones within the overall signal band increases. Systems designers typically compromise between this need for fewer dead zones and the width of the various wavelength bands being combined in the system. While add/drop features and functionality are becoming more important, adding add/drop capability can reduce available signal bandwidth through the creation of deadbands.

Additionally, optical amplifiers typically utilize thin film optical filters and thus also suffer the loss of bandwidth due to the deadbands of the thin film filters. An amplifier system combining the C and L bands of an erbium amplifier produces deadbands between these two bands of approximately 10 nm.

Accordingly, it would be highly advantageous to provide for the capability to add, drop, and amplify portions of the communication spectrum without substantially reducing signal bandwidth.

SUMMARY OF THE INVENTION

The present invention provides advantageous methods and apparatus for adding and/or dropping channels in an optical communication system without substantially reducing overall system bandwidth. According to one aspect of the present invention, an optical filter is used to drop a wavelength range from an optical signal. Prior to the optical signal entering the optical filter, one or more fiber Bragg gratings and an optical circulator are used to reflect a portion of the communication spectrum which would normally lie within the deadband region of the optical filter.

According to another aspect of the present invention, an optical filter is used to combine a first optical signal and a second optical signal to form a combined optical signal. Neither the first optical signal nor the second optical signal includes channels within a deadband region of the optical filter. One or more fiber Bragg gratings and an optical circulator are used to add a third optical signal to the combined optical signal. The third optical signal includes channels within the deadband region of the optical filter.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 7 is a schematic view of an alternative embodiment of the invention; and

FIGS. 8, 9, and 10 are schematic views of various alternative embodiments of an optical add/drop system in accordance with the present invention.

DETAILED DESCRIPTION

The present invention now will be described more fully with reference to the accompanying drawings, in which several alternative embodiments of the invention are shown. However, this invention may be embodied in various forms and should not be construed as limited to the exemplary embodiments set forth herein. Rather, these representative embodiments are described in detail so that this disclosure will be thorough and complete, and will fully convey the scope, structure, operation, functionality, and potential of applicability of the invention to those skilled in the art. In the description that follows, "optical connection" refers to optical coupling between components by, for example, a single mode optical fiber, but it is recognized by those skilled in the art that other optical connection mechanisms may be used. These may include, for example, other types of fiber or free space optical coupling. In addition, the "optical connection" may include devices such as, for example, pairs of single mode fibers, collimators, optical buffers, optical amplifiers, optical connectors, and other such devices.

While in the examples that follow, the fiber Bragg gratings referred to reflect a fixed wavelength range, those skilled in the art will recognize that tunable fiber Bragg gratings may also be utilized. An exemplary type of fiber Bragg grating suitable for use with the present invention is described in U.S. patent application Ser. No. 09/398,657 filed Sep. 17, 1999 entitled "Fiber Bragg Grating with Cladding Mode Suppression" which is incorporated herein by reference as though set forth in its entirety.

Figure 1A:
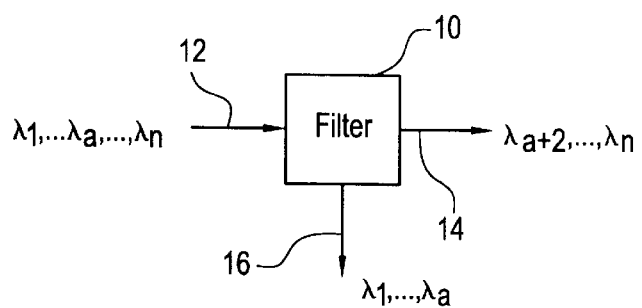
FIG. 1A is a block diagram of a prior art optical filter used to drop channels.
Figure 1B:
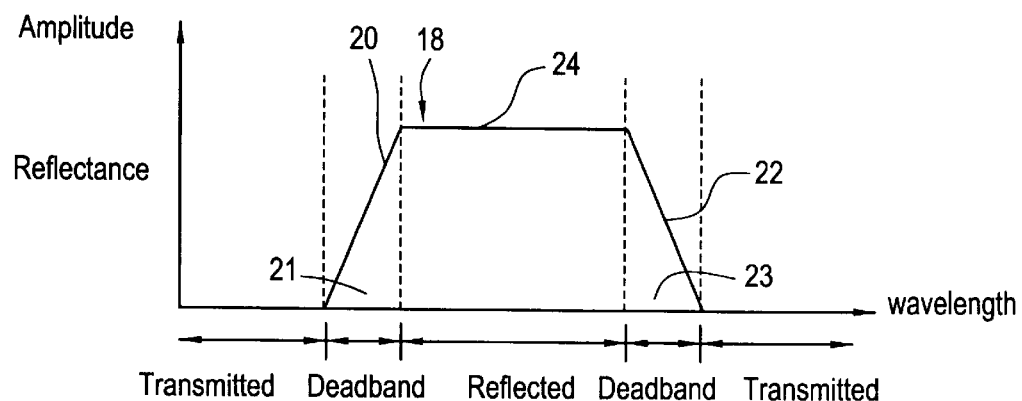
FIG. 1B is a plot of the reflectance curve for the prior art optical filter of FIG. 1A.
Figure 1C:
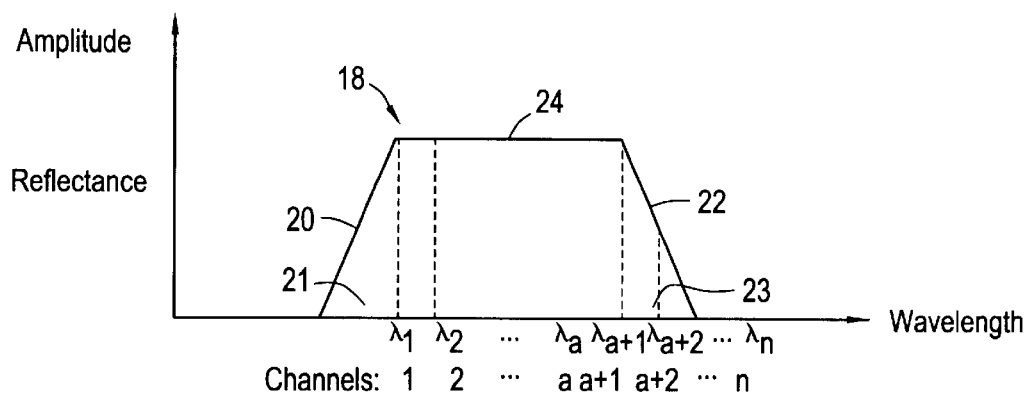
FIG. 1C shows an exemplary channel allocation plan using the prior art optical filter of FIG. 1A.

Referring to the drawings, FIG. 1A is a block diagram of a typical prior art thin film optical filter 10 used to drop signal wavelengths. The optical filter 10 receives an input optical signal 12, transmits output optical signal 14, and reflects a reflected output optical signal 16. As can be seen from FIGS. 1B and 1C, due to the non-ideal nature of the optical filter 10, the reflectance curve 18 includes a rising edge 20 and a falling edge 22. The wavelength ranges of both the rising edge 20 and the falling edge 22 of the reflectance curve 18 are referred to as "deadband" regions 21, 23 since optical signal wavelengths in these regions may be unusable as a practical matter since they are neither completely transmitted nor reflected by the optical filter. The filter 10 has a bandpass region 24 in which optical signal wavelengths within the bandpass region 24 are substantially reflected. Those outside the bandpass region 54 and the deadband regions 21, 23 are substantially transmitted.

For example, assume the optical filter 10 is designed to reflect (or drop) wavelengths $\lambda_1, \ldots, \lambda_a$ which contain corresponding channels 1, ..., a from a wavelength division multiplexed optical signal composed of wavelengths $\lambda_1, \ldots, \lambda_a, \ldots, \lambda_n$ which contain corresponding channels 1, ... a, ..., n. Further, assume the optical filter 10 is designed to transmit (or pass) wavelengths $\lambda_{a+2}, \ldots, \lambda_n$. As shown in the channel allocation plan of FIG. 1C, wavelength $\lambda_{a+1}$ is within the deadband region corresponding to the falling edge 22 of optical filter 10 and neither substantially transmitted nor substantially reflected as are the reflected wavelengths $\lambda_1, \ldots, \lambda_a$ and the transmitted wavelengths $\lambda_{a+2}, \ldots, \lambda_n$, respectively. The signal wavelength $\lambda_{a+1}$ is attenuated and, depending on the exact shape of the reflectance curve 18, only partially transmitted and reflected. Thus, channel a+1 which is carried by signal wavelength $\lambda_{a+1}$ is not at a required signal strength and is effectively unusable.

As is well understood by those skilled in the art, an alternative embodiment of the optical filter may be a transmittance curve similar to the reflectance curve 18 in which wavelengths $\lambda_{a+2}, \ldots, \lambda_n$ are reflected, rather than transmitted, and wavelengths $\lambda_1, \ldots, \lambda_a$ are transmitted, rather than reflected.

Figure 1D:
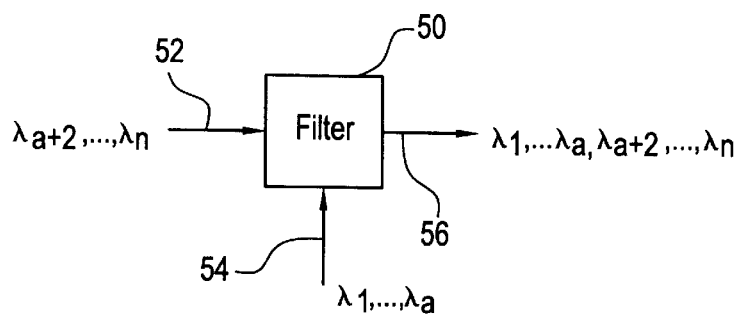
FIG. 1D is a block diagram of a prior art optical filter used to add channels.
Figure 1E:
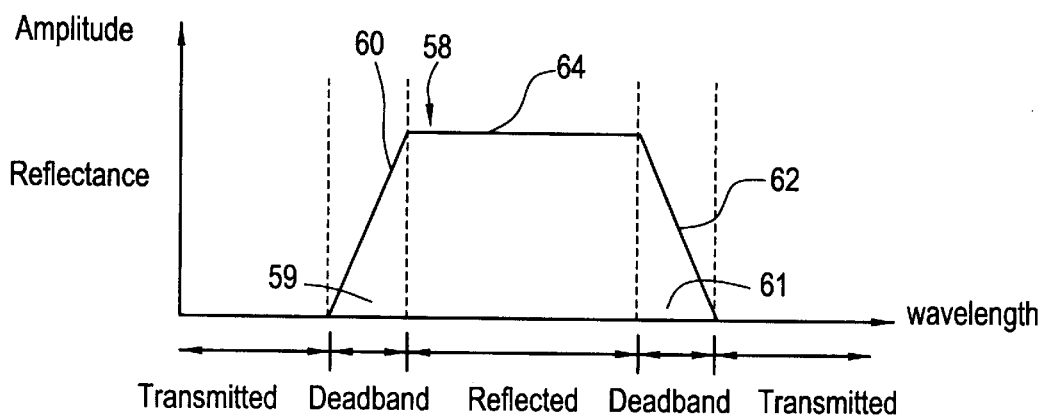
FIG. 1E is a plot of the reflectance curve for the prior art optical filter of FIG. 1D.

FIG. 1D is a block diagram of typical prior art thin film optical filter 50 used to combine, or add, wavelengths. The optical filter 50 receives a first input optical signal 52, and a second input optical signal 54, and transmits an output optical signal 56. Like the reflectance curve 18 of the optical filter 10, a reflectance curve 58 of the optical filter 50 includes two deadband regions 59, 61, which correspond to wavelength ranges of the rising edge 60 and falling edge 62. Optical signals at wavelengths within these deadband regions 59, 61, are neither substantially transmitted nor substantially reflected by the optical filter 50. The optical filter 50 also has a bandpass region 64. Optical signal wavelengths within the bandpass region 64 which are present in the second input optical signal 54 are substantially reflected to the output optical signal 56, and those wavelengths outside the bandpass region 64 and outside the deadband regions 59, 61, which are present in the first input optical signal 52 are substantially transmitted to the output optical signal 56.

Figure 1F:
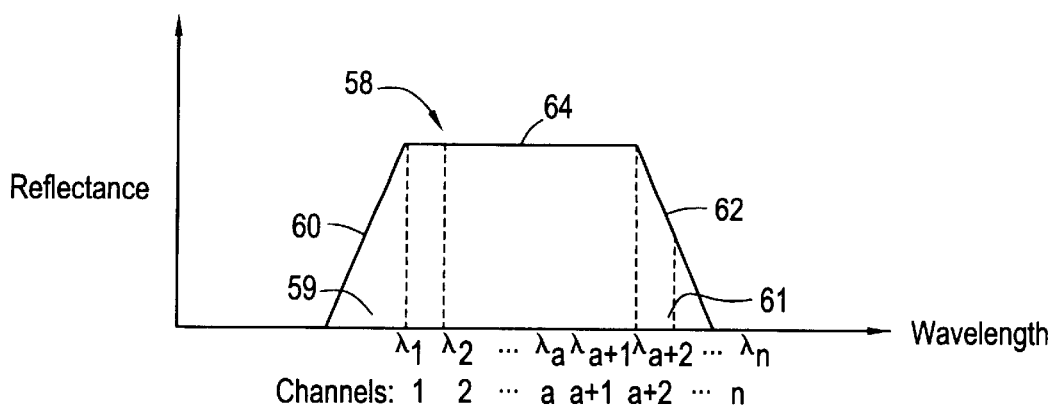
FIG. 1F shows an exemplary channel allocation plan using the prior art optical filter of FIG. 1D.

For example, as shown in FIG. 1F, assume optical filter 50 is designed to reflect (or add) wavelengths $\lambda_1, \ldots, \lambda_a$ present in the second input optical signal 54 to the output optical signal 56. Further, assume the optical filter 50 is also designed to transmit (or pass) wavelengths $\lambda_{a+2}, \ldots, \lambda_n$ present in the first input optical signal to the output optical signal 56. As shown in the channel allocation plan of FIG. 1F in which wavelengths $\lambda_1, \ldots, \lambda_a$ and $\lambda_{a+2}, \ldots, \lambda_n$ contain channels 1, ..., a and a+2, ... n, a wavelength $\lambda_{a+1}$ is within the falling edge 62 of optical filter 50. If either the first input optical signal 52 or the second input optical signal 54 included the wavelength $\lambda_{a+1}$, the wavelength $\lambda_{a+}$ would be neither substantially transmitted nor substantially reflected with the same magnitude as the reflected wavelengths $\lambda_1, \ldots, \lambda_a$ and the transmitted wavelengths $\lambda_{a+2}, \ldots, \lambda_n$. The wavelength $\lambda_{a+1}$ would be attenuated and only partially transmitted and reflected, preventing wavelength $\lambda_{a+1}$ from being useful to carry a channel a+1. Thus, the output signal 56 includes the wavelengths $\lambda_1, \ldots, \lambda_a$ and $\lambda_{a+2}, \ldots, \lambda_n$.

As is well understood by those skilled in the art, an alternative embodiment of the optical filter 50 may have transmittance curve similar to the reflectance curve 58 in which wavelengths $\lambda_{a+2}, \ldots, \lambda_n$ are reflected, rather than transmitted, and wavelengths $\lambda_1, \ldots, \lambda_a$ are transmitted, rather than reflected.

For ease of explanation of the embodiments of the present invention described below, the embodiments will be described in terms of a 32 wavelength system ($\lambda_1, \ldots, \lambda_{32}$) with signal wavelengths $\lambda_7$ and $\lambda_8$ being substantially included in a deadband wavelength range of the optical filters. One skilled in the art would appreciate that the present invention may include different numbers of input signal wavelengths, output signal wavelengths, added signal wavelengths, dropped signal wavelengths, and signal wavelengths within the deadband region without departing from the teachings and spirit of the present invention.

Figure 2A:
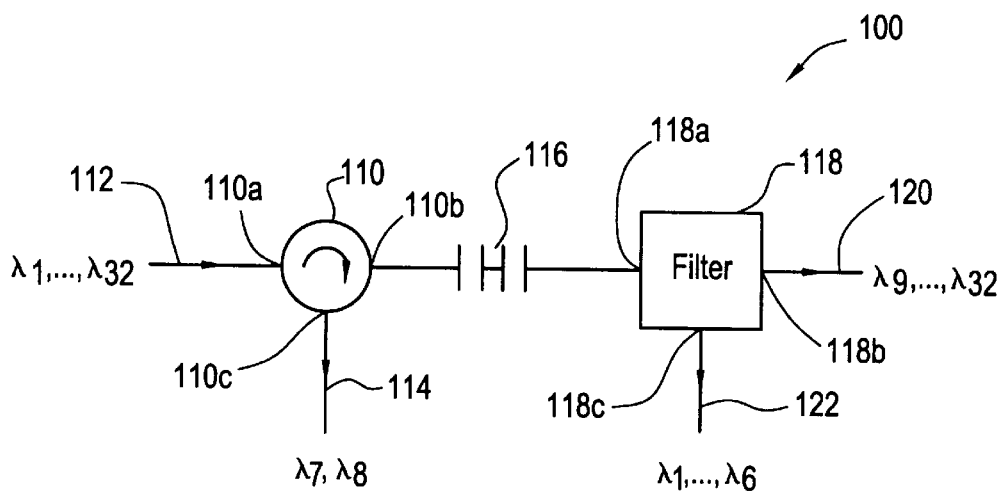
FIG. 2A is a schematic view of an optical demultiplexing system in accordance with the present invention.

FIG. 2A shows a schematic view of an optical demultiplexing communication system 100 in accordance with one aspect of the present invention. Optical demultiplexing system 100 includes an optical circulator 110 with ports 110a, 110b, and 110c. The optical circulator 110 is configured such that optical signals that enter the port 110a are routed to the port 110b, and optical signals that enter the port 110b, are routed to the port 110c. A first input 112 is optically connected to the port 110a. The port 110c is optically connected to an output 114, and the port 110b is optically connected through one or more fiber Bragg gratings 116 to a port 118a of an optical filter 118. In addition to the port 118a, the optical filter 118 also includes a port 118b connected to an output 120, and a port 118c connected to an output 122.

Figure 2B:
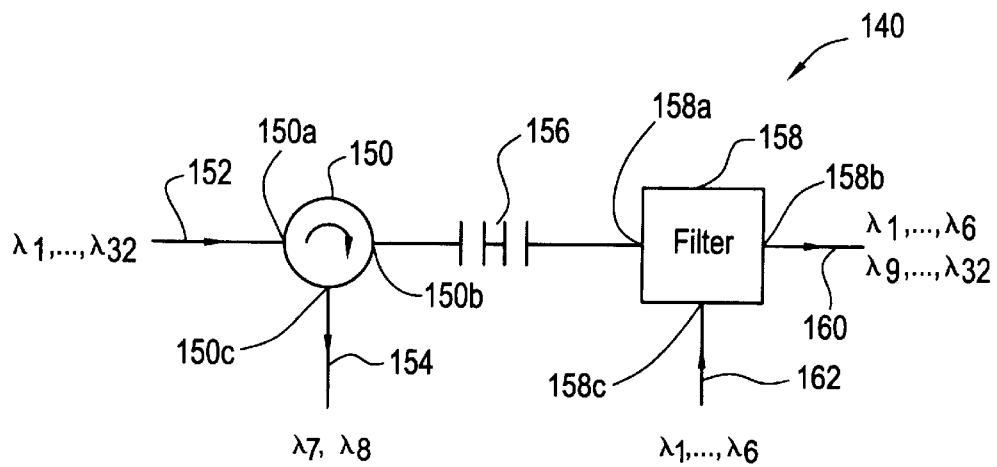
FIG. 2B is a schematic view of an optical multiplexing system in accordance with the present invention.
Figure 2C:
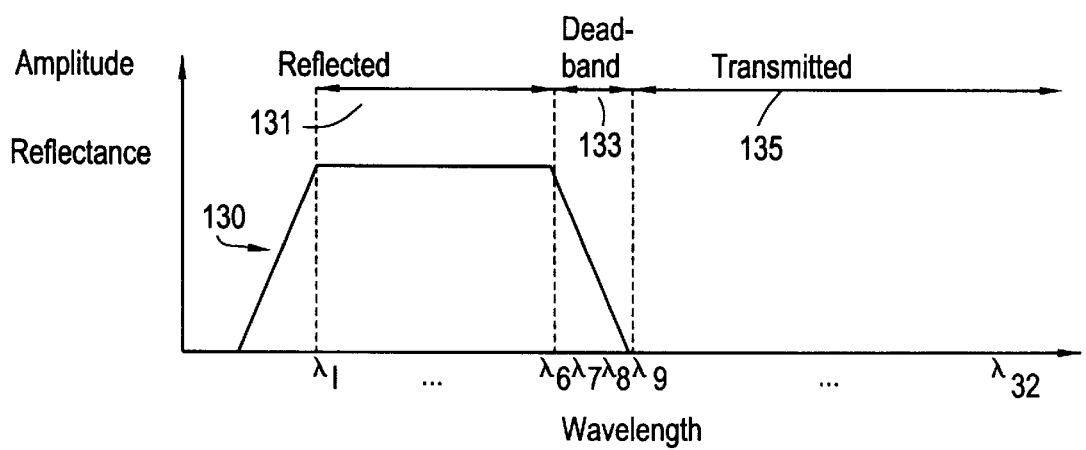
FIG. 2C is a plot of the reflectance curve of an optical filter in accordance with the present invention.

The operation of the system 100 will be described in terms of the optical filter 118 with a reflectance curve 130 as shown in FIG. 2C. Reflectance curve 130 includes a reflected wavelength range 131 substantially including signal wavelengths $\lambda_1, \ldots, \lambda_6$, a deadband wavelength range 133 substantially including signal wavelengths $\lambda_7$ and $\lambda_8$, and a transmitted wavelength range 135 substantially including signal wavelengths $\lambda_9, \ldots, \lambda_{32}$. A multiplexed input signal having optical signal wavelengths $\lambda_1, \ldots, \lambda_{32}$ is carried by the input 112 to the port 110a of the optical circulator 110. The optical circulator 110 transmits the input signal to the port 110b where the one or more fiber Bragg gratings 116 reflect a wavelength range containing signal wavelengths $\lambda_7$ and $\lambda_8$, substantially corresponding to the falling edge deadband wavelength range of the optical filter 118. The reflected wavelength range containing signal wavelengths $\lambda_7$ and $\lambda_8$ is received by the optical circulator 110 on the port 110b and transmitted to the port 110c and then passed to the output 114.

The wavelength range not reflected by the one or more fiber Bragg gratings 116, containing signal wavelengths $\lambda_1, \ldots, \lambda_6$ and $\lambda_9, \ldots, \lambda_{32}$, is passed to the port 118a of the optical filter 118. The optical filter 118 transmits the signal wavelengths $\lambda_9, \ldots, \lambda_{32}$ through the port 118b to the output 120, and reflects the signal wavelengths $\lambda_1, \ldots, \lambda_6$ through the port 118c to the output 122.

FIG. 2B shows a schematic view of an optical demultiplexing communication system 140 in accordance with another aspect of the present invention. Optical demultiplexing system 140 includes an optical circulator 150 with ports 150a, 150b, and 150c. A first input 152 is optically connected to the port 150a, the port 150c is optically connected to an output 154, and the port 150b is optically connected through one or more fiber Braggs gratings 156 to a port 158a of an optical filter 158. In addition to the port 158a, the optical filter 158 also includes a port 158b connected to an output 160, and a port 158c connected to an input 162.

The optical circulator 150 is configured such that optical signals that enter the port 150a are routed to the port 150b, and optical signals that enter the port 150b are routed to the port 150c.

The operation of the system 140 will be described in terms of the optical filter 158 with a reflectance curve 130 as shown in FIG. 2C described above. A multiplexed input signal having optical signal wavelengths $\lambda_7, \ldots, \lambda_{32}$ is carried by the input 152 to the port 150a of the optical circulator 150. The optical circulator 150 transmits the input signal to the port 150b where the one or more fiber Bragg gratings 156 reflect a wavelength range containing signal wavelengths $\lambda_7$ and $\lambda_8$, which are within the falling edge deadband wavelength range of the optical filter 158. The reflected wavelength range containing signal wavelengths $\lambda_7$ and $\lambda_8$ is received by the optical circulator 150 on the port 150b and transmitted to the port 150c and then passed to the output 154.

The wavelength range not reflected by the one or more fiber Bragg gratings 156, containing signal wavelengths $\lambda_9, \ldots, \lambda_{32}$, is passed to the port 158a of the optical filter 158. A second multiplexed input signal having optical signal wavelengths $\lambda_1, \ldots, \lambda_6$ is carried on the input 162 to the port 158c. The optical filter 158 transmits the signal wavelengths $\lambda_9, \ldots, \lambda_{32}$ through the port 158b to the output 160, and reflects the signal wavelengths $\lambda_1, \ldots, \lambda_6$ through the port 158b to the output 160. Thus, the output 160 includes signal wavelengths $\lambda_1, \ldots, \lambda_6$ and $\lambda_9, \ldots, \lambda_{32}$.

Figure 3A:
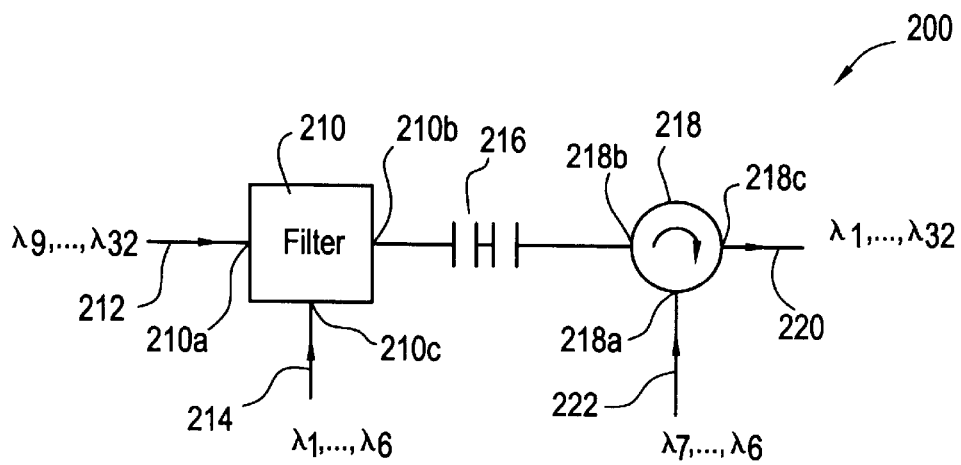
FIG. 3A is a schematic view of an alternate embodiment of an optical multiplexing system in accordance with the present invention.

FIG. 3A shows a schematic view of an optical multiplexing system 200 in accordance with another aspect of the present invention. Optical multiplexing system 200 includes an optical filter 210 with ports 210a, 210b, and 210c. A first input 212 is optically connected to the port 210a and a second input 214 is optically connected to the port 210c. The port 210b is optically connected through one or more fiber Bragg gratings 216 to a port 218b of an optical circulator 218. The optical circulator 218 is configured such that optical signals which pass through the port 218a are routed to the port 218b and optical signals which pass through the port 218b are routed to the port 218c. The port 218a is connected to an input 222, and a port 218c connected to an output 220.

The operation of the system 200 will be described in terms of the optical filter 210 with a reflectance curve 130 as shown in FIG. 2C and described above. A first plurality of input signal wavelengths $\lambda_9, \ldots, \lambda_{32}$ is carried by the input 212 to the port 210a of the optical filter 210, where signal wavelengths $\lambda_9, \ldots, \lambda_{32}$ are transmitted through the port 210b. A second plurality of input signal wavelengths $\lambda_1, \ldots, \lambda_6$ is carried by the input 214 to the port 210c of the optical filter 210, where signal wavelengths $\lambda_1, \ldots, \lambda_6$ are reflected through the port 210b. Signal wavelengths $\lambda_1, \ldots, \lambda_6$ and $\lambda_9, \ldots, \lambda_{32}$ pass through the one or more fiber Bragg gratings 216 to the port 218b of the optical circulator. A third plurality of input signal wavelengths $\lambda_7$ and $\lambda_8$ is carried by the input 222 to the port 218a of the optical circulator. The optical circulator transmits signal wavelengths $\lambda_7$ and $\lambda_8$ through the port 218b where the one or more fiber Bragg gratings 216 reflect the signal wavelengths $\lambda_7$ and $\lambda_8$ back to the port 218b. Thus, the signal wavelengths $\lambda_1, \ldots, \lambda_{32}$ enter the port 218b and exit the circulator through the port 218c to the output 220.

Figure 3B:
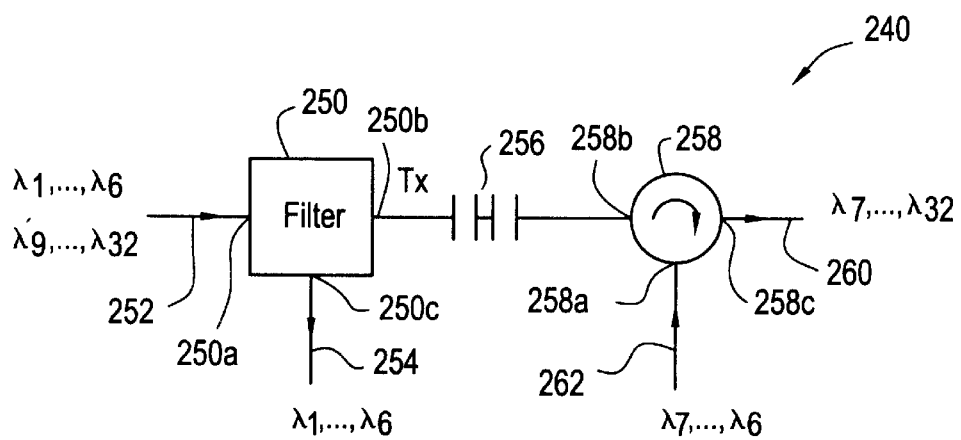
FIG. 3B is a schematic view of an alternate embodiment of an optical demultiplexing in accordance with the present invention.

FIG. 3B shows a schematic view of an optical demultiplexing system 240 in accordance with another aspect of the present invention. Optical multiplexing system 240 includes an optical filter 250 with ports 250a, 250b, and 250c. An input 252 is optically connected to the port 250a and an output 254 is optically connected to the port 250c. The port 250b is optically connected through one or more fiber Bragg gratings 256 to a port 258b of an optical circulator 258. The optical circulator 258 is configured such that optical signals which pass through the port 258a are routed to the port 258b and optical signals which pass through the port 258b are routed to the port 258c. The port 258a is connected to an input 262, and the port 258c is connected to an output 260.

The operation of the system 240 will be described in terms of the optical filter 250 with a reflectance curve 130 as shown in FIG. 2C and described above. A first plurality of input signal wavelengths $\lambda_1, \ldots, \lambda_6$ and $\lambda_9, \ldots, \lambda_{32}$ is carried by the input 252 to the port 250a of the optical filter 250, where signal wavelengths $\lambda_9, \ldots, \lambda_{32}$ are transmitted through the port 250b and signal wavelengths $\lambda_1, \ldots, \lambda_6$ are reflected through the port 250c. Signal wavelengths $\lambda_9, \ldots, \lambda_{32}$ pass through the one or more fiber Bragg gratings 256 to the port 258b of the optical circulator. A second plurality of input signal wavelengths $\lambda_7$ and $\lambda_8$ is carried by the input 262 to the port 258a of the optical circulator. The optical circulator transmits signal wavelengths $\lambda_7$ and $\lambda_8$ through the port 258b where the one or more fiber Bragg gratings 256 reflect the signal wavelengths $\lambda_7$ and $\lambda_8$ back to the port 258b. Thus, the signal wavelengths $\lambda_7, \ldots, \lambda_{32}$ enter the port 258b and exit the circulator through the port 258c, passing to the output 260.

Figure 4:
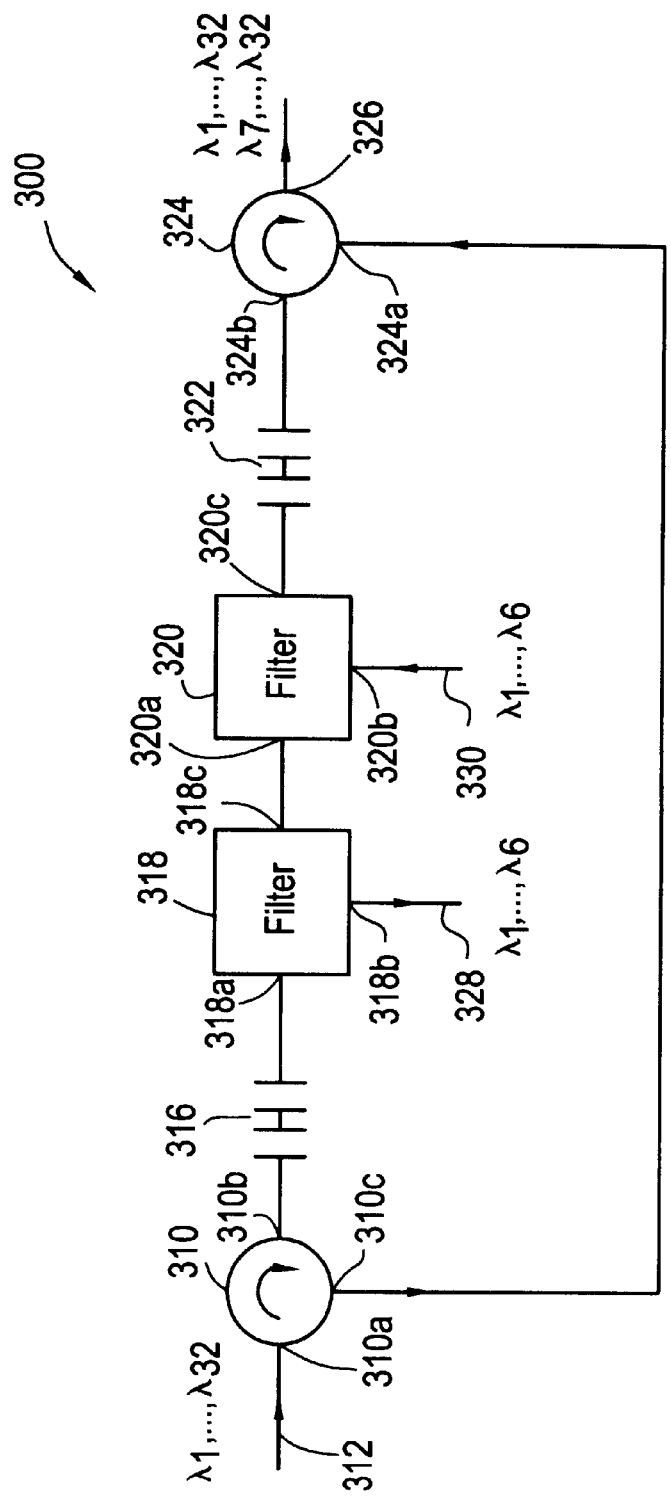
FIGS. 4 and 5 are schematic views of optical add/drop systems in accordance with the present invention.

FIG. 4 shows a schematic view of an optical add/drop communication system 300 in accordance with another aspect of the present invention. Optical add/drop system 300 includes a first optical circulator 310 with ports 310a, 310b, and 310c. A first input 312 is optically connected to the port 310a, port 310b is optically connected through one or more fiber Bragg gratings 316 to an input 318a of a first optical filter 318, and port 310c of the circulator is optically connected to a port 324a of a second optical circulator 324. Optical filter 318 also includes output ports 318b and 318c. Output port 318b is optically connected to an output 328 and port 318c is optically connected to an input port 320a of a second optical filter 320 which also includes ports 320b and 320c. Port 320b is optically connected to an input 330 and port 320c is optically connected through one or more fiber Bragg gratings 322 to a port 324b of the second optical circulator 324. The second optical circulator 324 also includes a port 324c connected to an output 326.

Ports 310a, 310b, and 310c of the first optical circulator 310 are configured such that optical signals that enter the port 310a are routed to the port 310b, and optical signals that enter the port 310b are routed to the port 310c. Ports 324a, 324b, and 324c of the second optical circulator 324 are configured such that optical signals that enter the port 324a are routed to the port 324b and optical signals that enter the port 324b are routed to the port 324c.

As would be recognized by one skilled in the art, the optical filters 318 and 320 may be implemented as discrete devices or they may be included in another optical device, such as an add-drop station. An exemplary add-drop device is described in greater detail in U.S. Pat. No. 5,786,915 which is incorporated herein by reference as though set forth in its entirety.

The operation of the system 300 will be described in terms of the optical filters 318 and 320, each with a reflectance curve 130 as shown in FIG. 2C and described above. An input signal having signal wavelengths $\lambda_1, \ldots, \lambda_{32}$ is carried by the input 312 to the port 310a of the first optical circulator 310. The optical circulator 310 transmits the input signal through the port 310b where the one or more fiber Bragg gratings 316 reflect a wavelength range containing signal wavelengths $\lambda_7$ and $\lambda_8$ which are within the deadband range corresponding to the falling edge of the reflectance curve 130 of optical filters 318 and 320. The reflected wavelength range containing signal wavelengths $\lambda_7$ and $\lambda_8$ is received by the first optical circulator 310 on its second port 320b, routed to its third port 310c, and passed to the port 324a of the second optical circulator 324. This second optical circulator 324 routes wavelengths $\lambda_7$ and $\lambda_8$ through the port 324b to the one or more fiber Bragg gratings which reflect wavelengths $\lambda_7$ and $\lambda_8$ back to that port.

The non-reflected portion of the input signal, signal wavelengths $\lambda_1, \ldots, \lambda_6$ and $\lambda_9, \ldots, \lambda_{32}$, is passed to the port 318a of the first optical filter 318. The optical filter 318 reflects signal wavelengths $\lambda_1, \ldots, \lambda_6$ to the output 328 through the port 318b and transmits signal wavelengths $\lambda_9, \ldots, \lambda_{32}$ to the port 320a of the optical filter 320 which transmits signal wavelengths $\lambda_9, \ldots \lambda_{32}$ to the port 320c. A second input signal having signal wavelengths $\lambda_1', \ldots \lambda_6'$ is carried by the input 330 to the port 320b of the second optical filter 320 which reflects wavelengths $\lambda_1', \ldots \lambda_6'$ to the port 320c and through the one or more fiber Bragg gratings 322. Signal wavelengths $\lambda_1', \ldots \lambda_6'$ and $\lambda_9, \ldots, \lambda_{32}$, along with the signal wavelengths $\lambda_7$ and $\lambda_8$ reflected by the gratings 322, enters port 324b of the second optical circulator which routes the signal wavelengths $\lambda_1', \ldots \lambda_6'$ and $\lambda_7, \ldots, \lambda_{32}$ to the port 324c, passing to the output 326. Thus, signal wavelengths $\lambda_1, \ldots, \lambda_6$ have been dropped and signal wavelengths $\lambda_1', \ldots \lambda_6'$ have been added without the loss of any system bandwidth.

Figure 5:
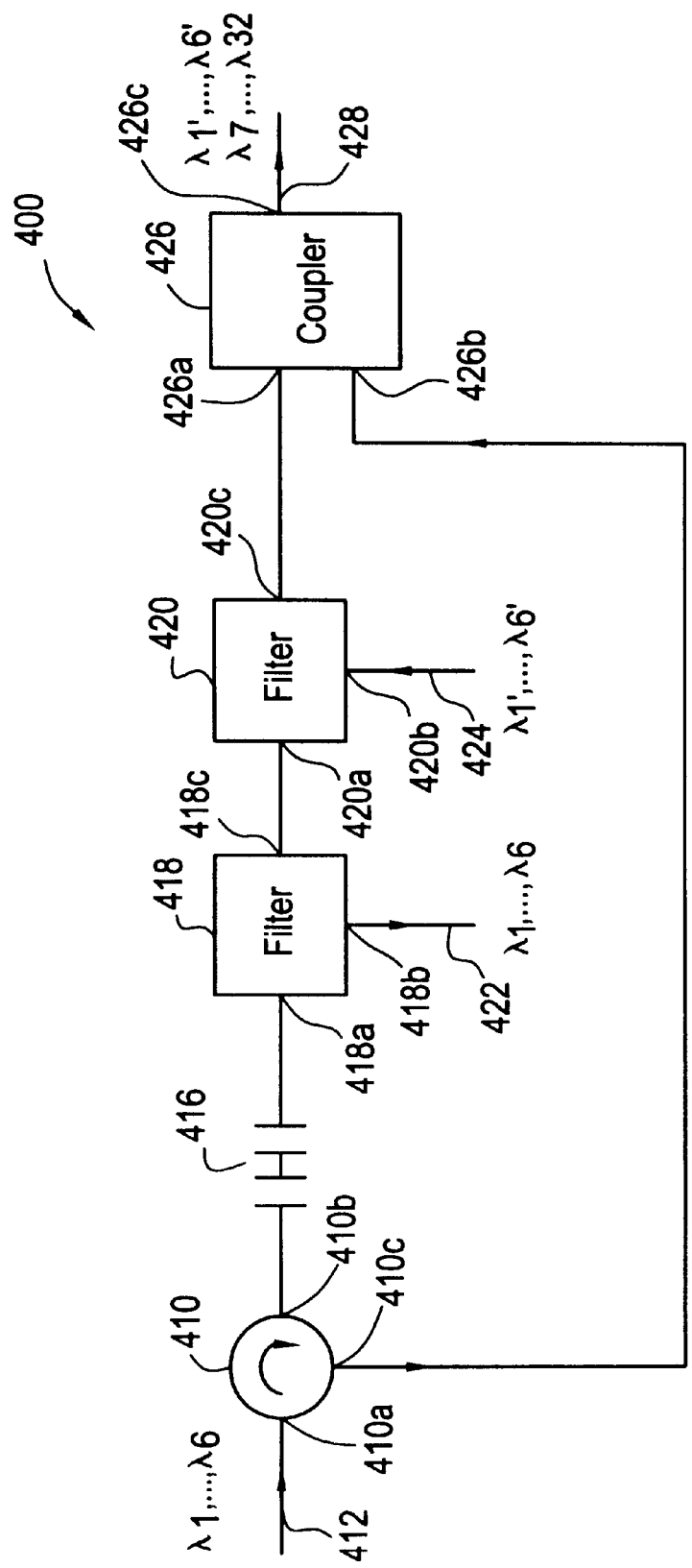

FIG. 5 shows a schematic view of an optical add/drop communication system 400 in accordance with another aspect of the present invention. Optical add/drop system 400 includes a optical circulator 410 with ports 410a, 410b, and 410c. A first input 412 is optically connected to the port 410a, port 410b is optically connected through one or more fiber Bragg gratings 416 to a port 418a of a first optical filter 418, and port 410c is optically connected to a port 426b of an optical coupler 426. Optical filter 418 also includes ports 418b and 418c. Port 418b is optically connected to an output 422 and port 418c is optically connected to a port 420a of a second optical filter 420 which also includes ports 420b and 420c. Port 420b is optically connected to an input 424 and Port 420c is optically connected to a port 426a of the optical coupler 426. In addition to ports 426a and 426b, optical coupler 426 also includes a port 426c connected to an output 428.

Ports 410a, 410b, and 410c of the first optical circulator 410 are configured such that optical signals that enter the port 410a are routed to the port 410b, and optical signals that enter the port 41b are routed to the port 410c. As would be recognized by one skilled in the art, the optical filters 418 and 420 may be implemented as discrete devices or they may be included in another optical device, such as an add-drop station described above.

The operation of the system 400 will be described in terms of the optical filters 418 and 420, each with a reflectance curve 130 as shown in FIG. 2C and described above. An input signal having signal wavelengths $\lambda_1, \ldots, \lambda_{32}$ is carried by the input 412 to the port 410a of the first optical circulator 410. The optical circulator 410 transmits the input signal through the port 410b where the one or more fiber Bragg gratings 416 reflect a wavelength range containing signal wavelengths $\lambda_7$ and $\lambda_8$ which are within a wavelength range corresponding to the falling edge deadband wavelength range of the optical filters 418 and 420. The reflected wavelength range containing signal wavelengths $\lambda_7$ and $\lambda_8$ is received by the optical circulator 410 on the port 410*b*, routed to the port 410*c*, and passed to the port 426*b* of the optical coupler 426.

The non-reflected portion of the input signal, signal wavelengths $\lambda_1, \ldots, \lambda_6$ and $\lambda_9, \ldots, \lambda_{32}$, is passed to the port 418*a* of the first optical filter 418. The optical filter 418 reflects signal wavelengths $\lambda_1, \ldots, \lambda_6$ to the output 422 through the port 418*b* and transmits signal wavelengths $\lambda_9, \ldots, \lambda_{32}$ to the port 420*a* of the optical filter 420 which transmits signal wavelengths $\lambda_9, \ldots, \lambda_{32}$ through the port 420*c* to the port 426*a* of the optical coupler 426. A second input signal having signal wavelengths $\lambda_1', \ldots, \lambda_6'$ is carried by the input 424 to the port 420*b* of the second optical filter 420 which reflects wavelengths $\lambda_1', \ldots, \lambda_6'$ through the port 420*c* to the port 426*a* of the optical coupler 426. The optical coupler 426 combines signal wavelengths received by the port 426*a* $\lambda_1', \ldots, \lambda_6'$ and $\lambda_9, \ldots, \lambda_{32}$, with the signal wavelengths received by the port 426*b*, and transmits the combined signal wavelengths $\lambda_1', \ldots, \lambda_6'$ and $\lambda_7, \ldots, \lambda_{32}$ through the port 426*c* to the output 428. Thus, signal wavelengths $\lambda_1, \ldots, \lambda_6$ have been dropped and signal wavelengths $\lambda_1', \ldots, \lambda_6'$ have been added without the loss of any system bandwidth.

The basic concept used in the embodiments of FIGS. 4 and 5 can be used to increase bandwidth utilization in an optical system having a wavelength range that would otherwise be effectively unusable. These ranges will be called deadbands hereafter. Deadbands can arise from the incorporation into a module or system of thin film filters which themselves have deadbands. For example, with reference to FIG. 6, a bi-directional amplifier 401 in the C band with red and blue operation typically use thin film filters 403, 404 to split red and blue bands (approximately 1526 nm to 1534 nm, and 1542 nm to 1562 nm) which are then directed through different optical paths 405, 407. There is atypically deadband from about 1535 nm to 1541 nm, due to the use of the thin film filters, in such an amplifier module. Referring to FIG. 6*a*, another example of a device or system that would have deadbands is an erbium doped fiber amplifier (EDFA) device 409 which combines a C band amplifier 411 with an L band amplifier 413. The C band for an EDFA runs approximately from about 1526 nm to about 1562 nm, while the EDFA L band runs from about 1570 nm to about 1620 nm. This leaves a band between about 1562 nm and 1570 nm that in a would be unamplified and therefor effectively unusable. Use of a thin film filter 415 in such a device will result in further deadband wavelengths (which may or may not be contiguous with, adjacent to, or overlapping the deadband(s) of the amplifier module 409).

As shown in FIG. 7, an embodiment of the inventive concept can provide a mechanism for making these deadbands useable. An input signal having signal wavelengths $\lambda_1, \ldots, \lambda_N$ is carried by the input 419 to the first port 421*a* of the first three-port optical circulator 421. The optical circulator 421 transmits the input signal through its second port 421*b* where one or more fiber Bragg gratings 423 reflect a wavelength range containing signal wavelengths $\lambda_1, \lambda_n$ which are within the deadband range (or ranges) of the device 425. The fiber Bragg grating or gratings 423 are advantageously chosen so as to selectively reflect the wavelength or wavelengths which are of concern as being "deadband" wavelengths. The device 425 can be, for example, any of the amplifier systems discussed above or any other optical device having one or more deadbands (i.e., a wavelength or range of wavelengths which is not utilized or operated on by the device). The remainder of the wavelengths are optically coupled into the device 425, and after exiting the device 425, they are optically coupled to an output waveguide 427. The reflected wavelength range containing signal wavelengths $\lambda_1 \ldots \lambda_n$ is received by the first optical circulator C2 on its second port 421, routed to its third port 421*b*, onto an optical path 429. The optical path 429 may direct the signal wavelengths $\lambda_1 \ldots \lambda_n$ directly to an element 431 such as a coupler, a three port optical circulator, or other component or device for combining it with the signal that passed through the device 425 for propagation therewith onto the output waveguide 433. Alternatively, a second device 435, which is desired to operate on the signal wavelengths $\lambda_1 \ldots \lambda_n$ may be disposed in the optical path 429 between the circulator 421 and the component 431. This second device may be, for example, an amplifier configured to amplify signal wavelengths $\lambda_1 \ldots \lambda_n$.

An embodiment of an add/drop device according to the invention which is reconfigurable and operational in two directions is illustrated in FIG. 86. This embodiment could be used with signals in any bandwidth region, with appropriate choice of components. For illustrative purposes, it will be described in terms of signals in a "Red Band" initially traveling from left to right, and signals in a "Blue Band" initially traveling from right to left.

In this embodiment of an add/drop device 500 according to an embodiment of the invention, the full red band $\lambda_{R1}$, $\lambda_{R2}, \ldots, \lambda_{RN}$ of the transmission signal passes from a first port 501 of a broadband telecommunications system through first port 502*a* of a four-port circulator 502, out the second port 502*b*, and to a first fiber Bragg grating 503. A portion of the signal at "Red Drop" wavelength $\lambda_{Rd}$ is reflected from the first fiber Bragg grating 503, while the remainder is transmitted through a first optical isolator 504 and a second fiber Bragg grating 506, through a second circulator 508 and out the second network port 510.

The Red Drop signal at $\lambda_{Rd}$, travels back from the first fiber Bragg grating 503, through the circulator 502. It is transmitted out the third port 502*c* of the circulator 502, through a 3 dB coupler 512, and to a receiver 514.

In like manner, the full Blue Band of $\lambda_{B1}, \lambda_{B2}, \lambda_{BN}$ of the transmission signal will proceed starting from right to left as described, starting at the second network port 510 to the second port 508*b* and out through the third port 508*c* of the second optical circulator 508, then through a third fiber Bragg grating 516, a second optical isolator 518, a fourth fiber Bragg grating 520 on to the fourth port 502*d* of optical circulator 502. The full Blue Band then exits circulator port 502*a* and travels out to the first network port 501.

A Blue Drop wavelength $\lambda_{BD}$ will be totally reflected at the third fiber Bragg grating 516 to the third port 508*c* of the second circulator 508, and through a second 3 dB coupler 522 to the receiver 524.

The Red Add channel at wavelength $\lambda_{RA}$ starts at the red transmitter 526 and passes through optical isolator 530, 3 dB coupler 522 to the fourth port 508*d* of the second circulator 508. It exits the circulator 508 at port 508*a* and is reflected back to that port by the second fiber Bragg grating 506. The Red Add wavelength then exits the circulator 508 at its second port 508*b* and travels on to the second network port 510.

Figure 6:
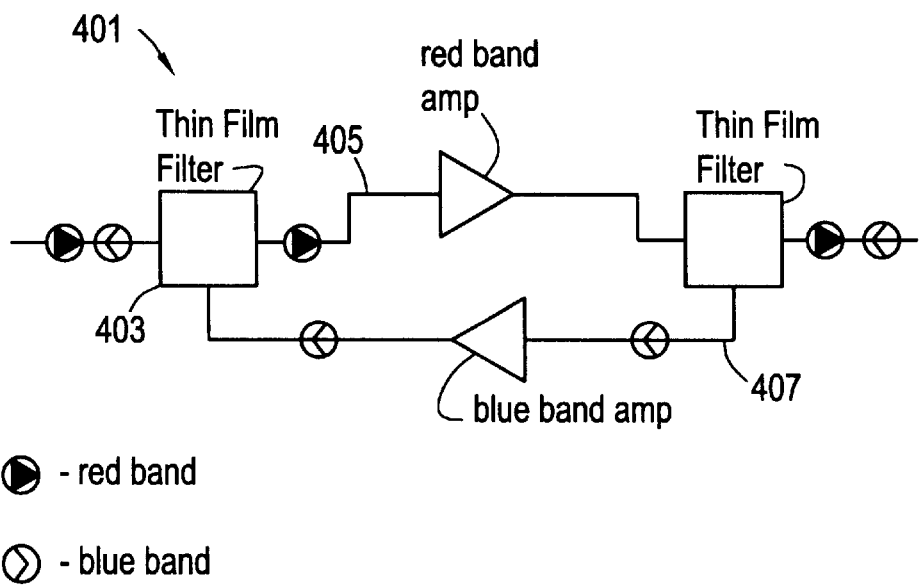
FIG. 6 is a schematic view of an amplifier system.
Figure 6A:
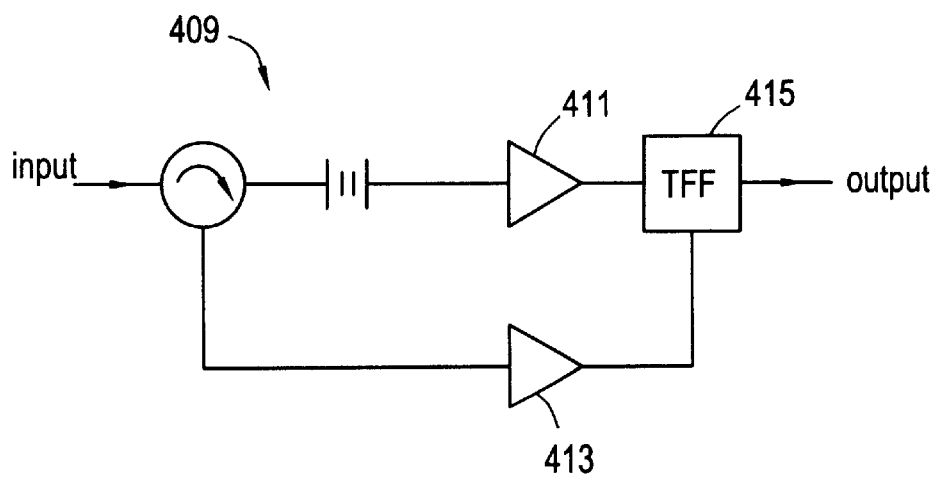
FIG. 6a is a schematic view of another amplifier system.

In a similar manner that will be apparent from a review of FIG. 6, the Blue Add channel at $\lambda_{BA}$ originates at the transmitter 528 and passes onto the network at its first port 501.

In this embodiment, the optical fiber used may be very low cladding mode broadband fiber from 1300–1700 to support the bandwidth of telecommunication systems without loss of signal or undue flatness penalty above a few tenths of a dB.

Although receivers 514 and 524 have been labeled as "Red Receiver" and "Blue Receiver", respectively, to aid the reader in understanding the illustration, these receivers typically will be broadband and identical. The first and second optical isolators 504, 518 prevent wavelengths other than the desired channel from entering the receiver.

The 3 dB couplers 512, 522 separate the Blue Drop wavelength and Red Drop wavelength traveling toward the receivers from the Blue Add wavelength and Red Add wavelength traveling from the transmitters. Optical isolator 530 prevents the Blue Drop wavelength from entering Red Transmitter 526. Likewise, isolator 532 keeps Red Drop wavelength from entering the Blue transmitter 528. In some instances, these isolators may not be needed in that some transmitters (red transmitters at high speeds, for example) include built-in optical isolators. However, if the isolation provided by the transmitter is not satisfactory or if the power levels are such that there would be interference or beating, the isolators 530, 532 may be used as described.

A coupler with ratio other than 3 dB could be used. For example, the coupling ratio could be changed to any other value, (20/80, for example) that appropriately balances optical power on the transmitter and Drop signal legs. If power is not adequate in one of these legs, an amplifier could be added to the leg to exactly match the desired system power requirements.

Use of broadband spectrum couplers for the 3 dB couplers 512, 522 allows dropping and adding of any wavelength channel in the desired band of operation without losing signal bandwidth. The use of such a coupler is advantageous in that it allows for adding or dropping wavelengths in such widely used bands as the 1300 nm erbium C band, erbium L band, the C+L band, and longer or shorter wavelengths.

Figure 9:
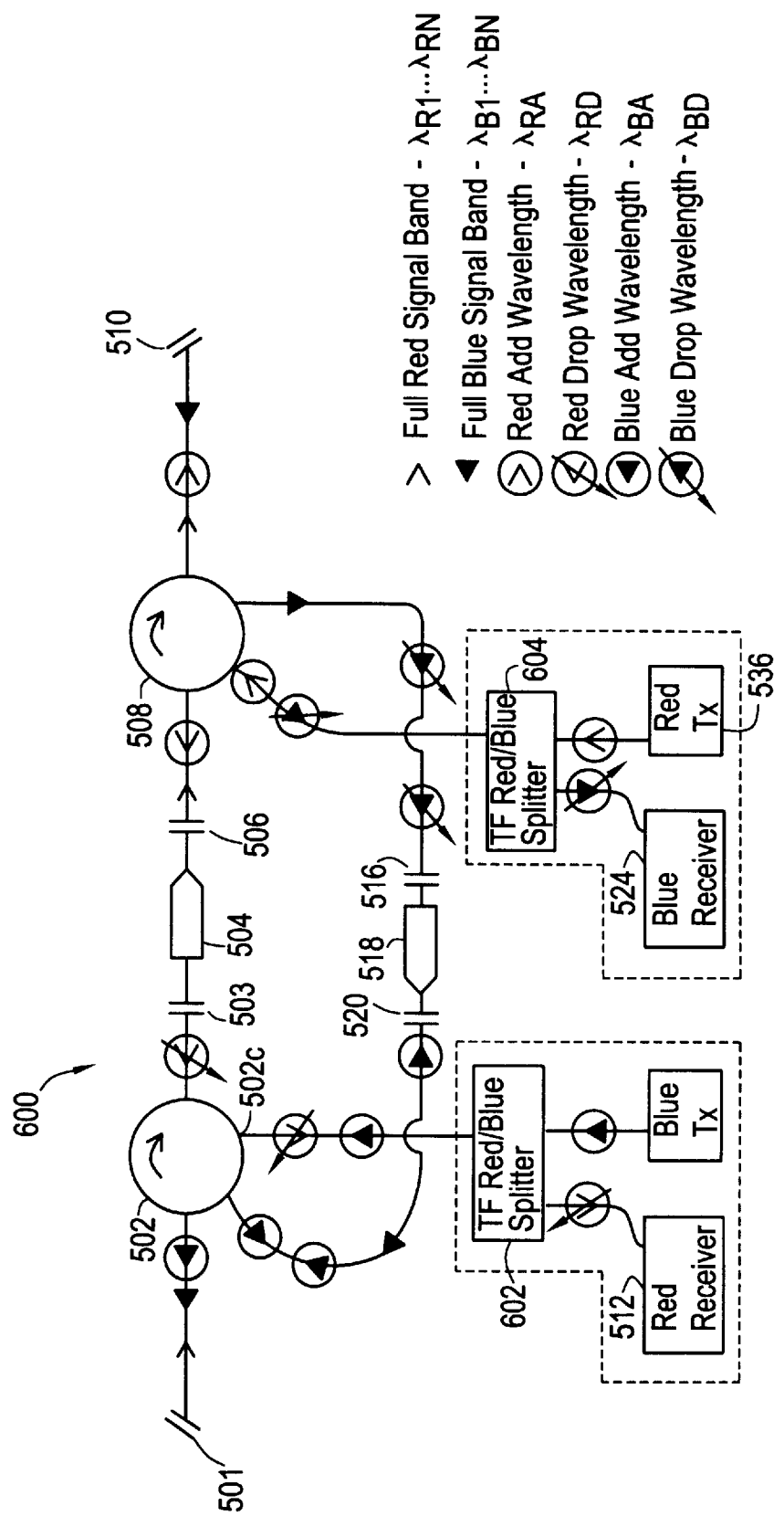

FIG. 9 shows an add/drop device 600 similar to the device 500 of FIG. 8, except that thin film splitters 602, 604 are used instead of the 3 dB couplers 512, 522 with isolators 532, 530 of FIG. 8. The thin film devices 602, 604 are of a type designed to reject any wavelength other than the desired add or drop wavelength. They would also prevent interference of incorrect wavelengths at the transmitters from corrupting the receiver signals.

The fiber Bragg gratings in these embodiments are preferably set at the smallest possible bandwidth dictated by the overall telecommunication system transmission speed. For example, approximately 50 GHz may be appropriate for 10 GHz system operation and 25 GHz or less for 2.5 Gbit/system operation. This results in the maximum number of channels transmitting in the through signal band without loss of signal.

The use of a four-port optical circulator in combination with the fiber Bragg grating permits bi-directional operation over a broad wavelength range with single or multiple channel adding and dropping.

In a reconfigurable embodiment of the invention, the second fiber Bragg grating 506 (at $\lambda_{RA}$) and the Red transmitter 536 (also at $\lambda_{RA}$) would be combined on the same plug-in card using a board mountable connector as is taught in for example, U.S. patent application Ser. No. 09/451,751 filed on Nov. 30, 1999, or U.S. patent application Ser. No. 09/387,961, filed on September 1999, both of which are incorporated herein by reference. This would permit a flexible, upgradable Add/Drop system at any wavelength in the desired band. In addition, this would be upgradable in terms of system speed. For example, had the system initially started at 2.5 Gbit, it could later move to 10 Gbit by supplying slightly larger bandwidth grating accommodated by the use of plug in cards. This embodiment could accommodate changes in transmission speed at any wavelength and for any of the current proposed transmission bands. Flexibility of wavelength upgrade and band of operation may be achieved by also combining first fiber Bragg grating 503 (at $\lambda_{RD}$) and red receiver 514 (at $\lambda_{RD}$) on the same plug in cards. Likewise, fiber Bragg grating 520 and blue transmitter 528 at wavelength $\lambda_{BA}$ as well as fiber Bragg grating 516 and blue receiver 524 (at $\lambda_{BD}$) may be on separate cards.

This proposed Add/Drop system could also be made configurable, using tunable fiber Bragg gratings. One of the benefits of this approach is that the tuning of the fiber Bragg grating would be needed only to tune a single channel in and out i.e., at 50 GHz system operation, only tune in out by 50 GHz to require the appropriate adding or dropping of a particular wavelength. This feature, combined with the plug-in cards, would give the maximum operational flexibility to plug and unplug cards, (the fiber Bragg grating and transmitters and receivers), the telecommunications system may go to bypass or be configured with the 2×2 switch at ports 1 & 2 to accomplish this bypass on an individual node basis.

Figure 10:
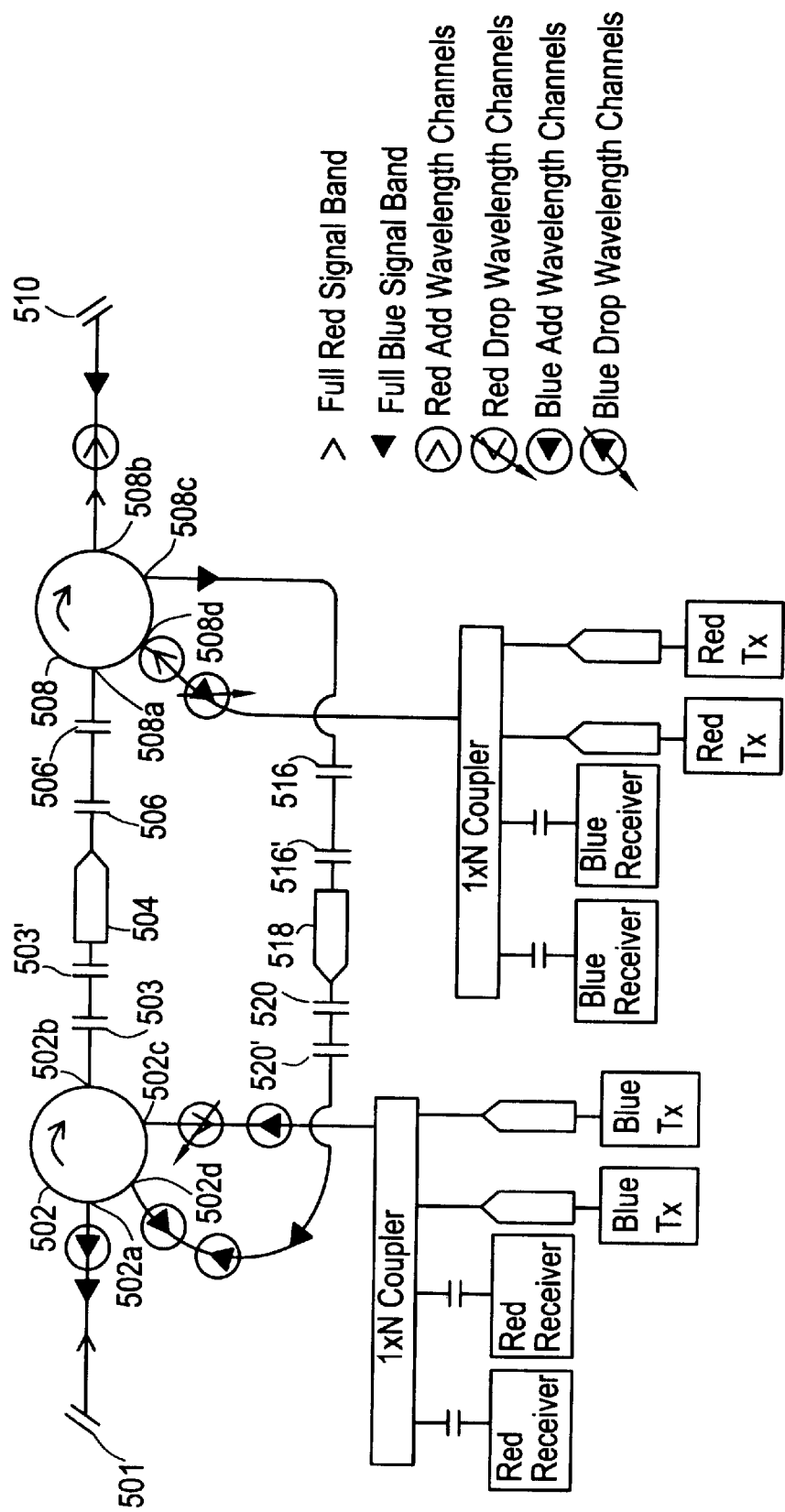

FIG. 10 shows an add/drop device similar to the device 500 of FIG. 8, but with the capability of adding and dropping multiple channel wavelengths. In this embodiment, the 3 dB coupler of FIG. 8 is replaced with a 1×N coupler with N/2 add and drop channels for symmetric operation. This embodiment may be made reconfigurable by placement of the fiber Bragg grating at a specific wavelength Ad on the same plug-in card as the transmitter at that wavelength $\lambda_1$.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

What is claimed is:

1. An optical communications system comprising:
    an optical circulator having a first port, a second port, and a third port, said optical circulator configured such that optical signals which are received by said first port of said optical circulator are routed to said second port of said optical circulator, and optical signals which are received by said second port of said optical circulator are routed to said third port of said optical circulator;
    an optical device including a first port and having a deadband wavelength range;
    a first optical communications path connecting said second port of said optical circulator to said first port of said optical device, and at least one grating in said first optical communications path configured such that optical signals substantially corresponding to said deadband wavelength range are reflected to said second port of said optical circulator and optical signals not reflected are transmitted to said first port of said optical device.

2. The apparatus of claim 1 wherein the optical device includes an optical filter.

3. The apparatus of claim 1 wherein the optical device includes an optical amplifier.

4. The apparatus of claim 1 wherein the at least one grating comprises at least one fiber Bragg grating.

5. The apparatus of claim 1 wherein the at least one grating comprises at least one tunable fiber Bragg grating.

6. The apparatus of claim 1 wherein the optical filter is configured such that optical signals of a first wavelength range received by the first port are substantially passed to the second port.

7. The apparatus of claim 6 wherein the optical filter is further configured such that optical signals of a second wavelength range received by the first port are substantially passed to the third port.

8. The apparatus of claim 7 further comprising:
   a second optical circulator having a first port, a second port, and a third port, said second optical circulator configured such that optical signals which are received by said first port of said second optical circulator are routed to said second port of said second optical circulator, and optical signals which are received by said second port of said second optical circulator are routed to said third port of said second optical circulator;
   a second optical filter including a first port, a second port, a third port, and having a second deadband wavelength range, configured such that optical signals corresponding to said second deadband wavelength range which are received the first port are not substantially transmitted to said second port or said third port;
   a second optical communications path connecting said second port of said second optical circulator to said first port of said second optical filter, said second optical communications path including at least one grating configured such that optical signals substantially corresponding to said second deadband wavelength range are reflected to said second port of said second optical circulator and optical signals not reflected are transmitted to said first port of said second optical filter; and
   a third optical communications path connecting the second port of the optical filter and said first port of said second optical circulator.

9. The apparatus of claim 6 wherein the optical filter is further configured such that optical signals of a second wavelength range received by the third port are substantially passed the to second port.

10. The apparatus of claim 9 further comprising:
    an optical coupler including a first port, a second port, and a third port, said optical coupler configured such that optical signals received by said first port of said optical coupler are combined with optical signals received by said second port and transmitted to said third port;
    a second optical communications path connecting said second port of said optical filter and said first port of said optical coupler; and
    a third optical communications path connecting said third port of said optical circulator and said second port of said optical coupler.

11. The apparatus of claim 10 wherein the first wavelength range includes a portion of the erbium C band; and the second wavelength range includes a portion of the erbium L band.

12. An apparatus for a wavelength division multiplexed optical communications system comprising:
    an optical circulator having a first port, a second port, and a third port, said optical circulator configured such that optical signals which are received by said first port of said optical circulator are routed to said second port of said optical circulator, and optical signals which are received by said second port of said optical circulator are routed to said third port of said optical circulator;
    an optical filter including a first port, a second port, a third port and characterized by a falling edge deadband wavelength range, said optical filter configured such that optical signals corresponding to said deadband wavelength range which are received by said first port are not substantially transmitted to said second port or said third port; and
    an optical communications path connecting said second port of said optical circulator to said second port of said optical filter, said optical communications path including at least one grating configured such that optical signals of said falling-edge deadband wavelength range are reflected to said third port of said optical circulator.

13. The apparatus of claim 12 wherein the optical filter is further configured such that optical signals of a first wavelength range received by the first port are substantially passed to the second port.

14. The apparatus of claim 13 wherein the optical filter is further configured such that optical signals of a second wavelength range received by the first port are substantially passed to the third port.

15. The apparatus of claim 13 wherein the optical filter is further configured such that optical signals of a second wavelength range received by the third port are substantially passed to the second port.

16. The apparatus of claim 12 wherein the at least one grating comprises at least one fiber Bragg grating.

17. The apparatus of claim 12 wherein the at least one grating comprises at least one tunable fiber Bragg grating.

18. A multiplexing/demultiplexing apparatus for a wavelength division multiplexed optical communications system comprising:
    a first optical circulator including a first port, a second port, and a third port, said first optical circulator configured such that optical signals which are received by said first port of said first optical circulator are output through said second port of said first optical circulator, and optical signals which are received by said second port of said first optical circulator are output through said third port of said first optical circulator;
    a first optical filter including a first port, a second port, and a third port configured such that optical signals corresponding to a deadband wavelength range received by said first port are not substantially passed to either said second port or said third port, optical signals corresponding to a first wavelength range received by said first port are substantially passed to said second port, and optical signals of a second wavelength range are substantially passed to said third port;
    a first optical communications path connecting said second port of said first optical circulator to said first port of said first optical filter, said first optical communications path including at least one first grating adapted to reflect optical signals substantially corresponding to said deadband wavelength range received from said second port of said first optical circulator;
    a second optical filter including a first port, a second port, and a third port configured such that optical signals corresponding to said deadband substantially passed to said second port, optical signals corresponding to said first wavelength range received by said first port are passed to said second port, and optical signals corresponding to said second wavelength range received by said third port are passed to said second port;

a second optical communications path connecting said second port of said first optical filter and said first port of said second optical filter;

a second optical circulator including a first port, a second port, and a third port, said second optical circulator configured such that optical signals which are received by said first port of said second optical circulator are transmitted to said second port of said second optical circulator, and optical signals which are received by said second port of said second optical circulator are transmitted to said third port of said second optical circulator;

a third optical communications path connecting said second port of said second filter to said second port of said second optical circulator, said third optical communications path including at least one second grating adapted to reflect said deadband wavelength range received from said second port of said second optical circulator; and a fourth optical communications path connecting said third port of said first optical circulator and said first port of said second optical circulator.

19. The multiplexing/demultiplexing apparatus of claim 18 wherein the at least one first grating comprises at least one first fiber Bragg grating, and the at least one second grating comprises at least one-second fiber Bragg grating.

20. A multiplexing/demultiplexing apparatus for a wavelength division multiplexed optical communications system comprising:

a first optical circulator including a first port, a second port, and a third port, said first optical circulator configured such that optical signals which are received by said first port of said first optical circulator are exit through said second port of said first optical circulator, and optical signals which are received by said second port of said first optical circulator are exit through said third port of said first optical circulator;

a first optical filter including a first port, a second port, and a third port configured such that optical signals corresponding to a deadband wavelength range received by said first port are not substantially passed to either said second port or said third port, optical signals corresponding to a first wavelength range received by said first port are substantially passed to said second port, and optical signals of a second wavelength range are substantially passed to said third port;

a first optical communications path connecting said second port of said first optical circulator to said first port of said first optical filter, said first optical communications path including at least one first grating adapted to reflect optical signals substantially corresponding to said deadband wavelength range received from said second port of said first optical circulator;

a second optical filter including a first port, a second port, and a third port configured such that optical signals corresponding to said deadband wavelength range which are received by said first port are not substantially passed to said second port, optical signals corresponding to said first wavelength range received by said first port are passed to said second port, and optical signals corresponding to said second wavelength range received by said third port are passed to said second port;

a second optical communications path connecting said second port of said first optical filter and said first port of said second optical filter;

an optical coupler including a first port, a second port, and a third port, said optical coupler configured such that optical signals received by said first port of said optical coupler are combined with optical signals received said second port and transmitted to said third port;

a third optical communications path connecting said second port of said second filter to said first port of said optical coupler; and a third optical communications path connecting said third port of said first optical circulator and said first port of said second optical circulator.

21. A method for dropping optical signals included within a drop wavelength range from an optical communication system, said optical communication system including an input optical signal corresponding to an input wavelength range and an output optical signal, the method comprising the steps of:

removing a deadband wavelength range from said input optical signal to form a first optical signal and a second optical signal, said first optical signal including said input wavelength range with said deadband wavelength range removed, said second optical signal including said deadband wavelength range; and removing said drop wavelength range from said first optical signal to form an output optical signal.

22. A method for adding optical signals included within an add wavelength range and a deadband wavelength range to an optical communication system, said optical communication system including a first input optical signal and a second input optical signal, the method comprising the steps of:

forming a first optical signal by combining said first input optical signal and said second optical signal, neither said first optical signal nor said second optical signal including optical signals within said deadband wavelength range; and forming an output optical signal by combining said first optical signal and at least one optical signal included within a deadband wavelength range.

* * * * *

UNITED STATES PATENT AND TRADEMARK OFFICE
CERTIFICATE OF CORRECTION

PATENT NO.    : 6,552,834 B2
DATED         : April 22, 2003
INVENTOR(S)   : Bhatia Vikram et al.

It is certified that error appears in the above-identified patent and that said Letters Patent is hereby corrected as shown below:

<u>Column 14,</u>
Line 63, "corresponding to said deadband substantially......" should be -- corresponding to said deadband wavelength range which are received by said first port are not substantially............. --

Signed and Sealed this

Twenty-sixth Day of August, 2003

JAMES E. ROGAN
*Director of the United States Patent and Trademark Office*